United States Patent [19]
Klaus

[11] Patent Number: 4,625,855
[45] Date of Patent: Dec. 2, 1986

[54] APPARATUS FOR DISPLACING PROFILED STEEL RODS OF A ROLL CONVEYOR

[75] Inventor: Siegfried Klaus, Ennepetal, Fed. Rep. of Germany

[73] Assignee: Carl-Ulrich Peddinghaus, Wuppertal-Barmen, Fed. Rep. of Germany

[21] Appl. No.: 670,536

[22] Filed: Nov. 13, 1984

[30] Foreign Application Priority Data

Nov. 12, 1983 [DE] Fed. Rep. of Germany ....... 3341109

[51] Int. Cl.$^4$ ............................................. B65G 47/94
[52] U.S. Cl. .................................... 198/367; 198/372; 414/748
[58] Field of Search ............... 198/360, 365, 372, 367, 198/599; 414/748; 83/157, 158

[56] References Cited

U.S. PATENT DOCUMENTS

| | | | |
|---|---|---|---|
| 1,760,875 | 6/1930 | Little | 198/372 |
| 3,150,763 | 9/1964 | Immesberger | 198/372 X |
| 3,348,678 | 10/1967 | Flowers | 198/365 |
| 3,370,494 | 2/1968 | Schenck | 83/155.1 |
| 4,016,072 | 4/1977 | Cavenar | 414/748 |
| 4,334,421 | 6/1982 | Ostlinning et al. | 198/372 X |
| 4,555,010 | 11/1985 | Solund | 198/365 X |

FOREIGN PATENT DOCUMENTS

| | | | |
|---|---|---|---|
| 1182570 | 6/1959 | France | 198/365 |
| 489702 | 1/1966 | U.S.S.R. | 198/360 |
| 668854 | 6/1979 | U.S.S.R. | 198/372 |

*Primary Examiner*—Joseph E. Valenza
*Assistant Examiner*—Michael Stone
*Attorney, Agent, or Firm*—Karl F. Ross; Herbert Dubno

[57] ABSTRACT

An apparatus for displacing profiled steel rods, especially concrete reinforcing rods, off a roll conveyor. The apparatus includes a plurality of bars interspersed with the rolls of the conveyor. At their undersides, the bars are associated with respective bearing bolts which are adapted to be received by horizontally aligned sockets so that in the rest position the upper surfaces of the bars are located below the level of the top of the conveyor. Piston and cylinder combinations are provided at each side of the conveyor to selectively raise one bearing bolt out of its socket while retaining the other bearing bolt seated in its socket, thereby to move the bars up above the conveyor and to create an inclined plane by which a rod traveling along the conveyor and engaged by the bars can be displaced and cast off the conveyor to one side or the other depending on the sense of inclination of the bars.

1 Claim, 3 Drawing Figures

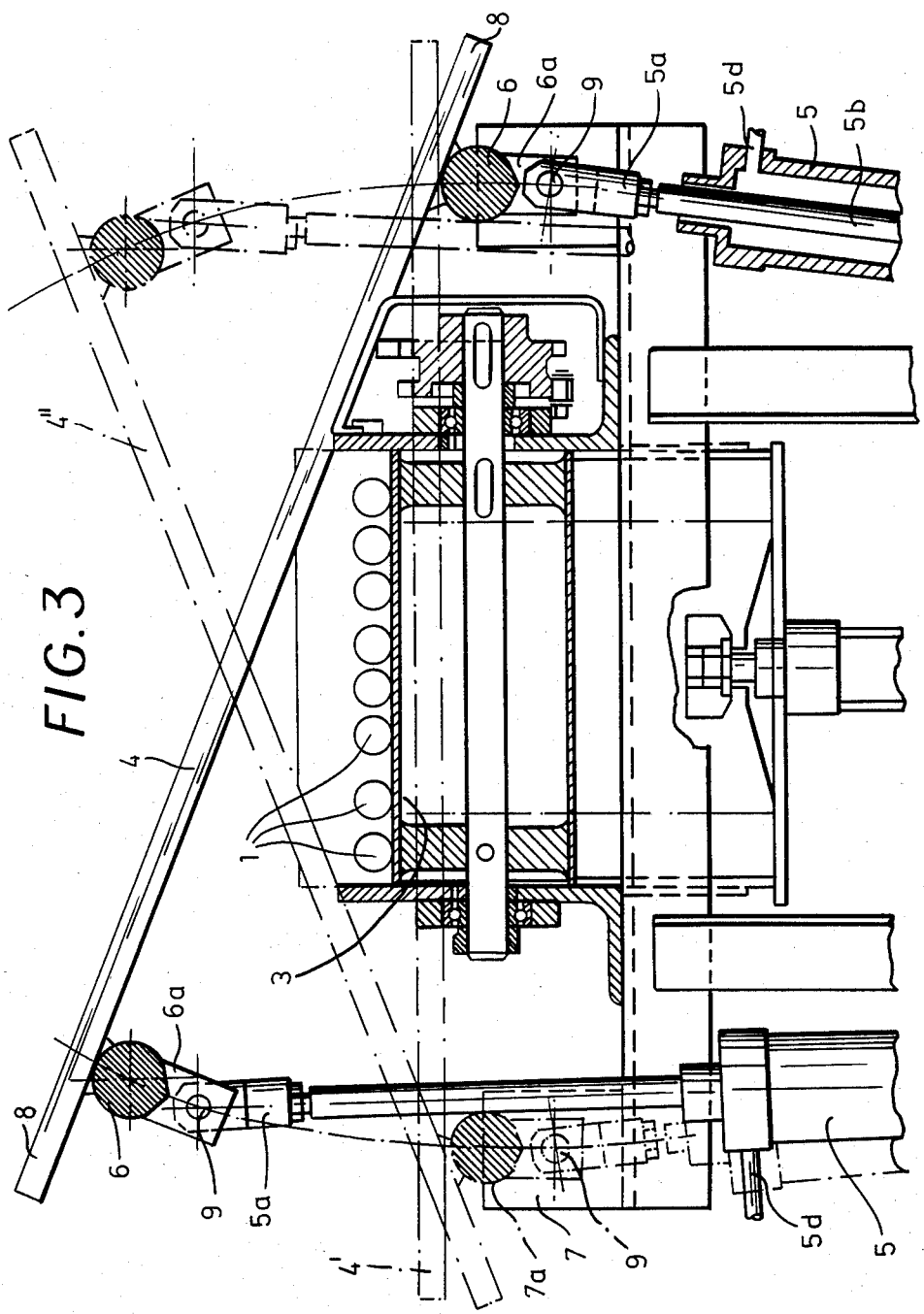

APPARATUS FOR DISPLACING PROFILED STEEL RODS OF A ROLL CONVEYOR

FIELD OF THE INVENTION

This invention relates to an apparatus for displacing profiled steel rods, such as concrete reinforcing rods, from a multi-roll conveyor in a rod-handling facility.

BACKGROUND OF THE INVENTION

Profiled steel rods, such as concrete reinforcing rods, are generally conducted away from their final processing stage in a rod-handling facility by means of a multi-roll conveyor which usually includes a plurality of driven and/or idle feed rolls. In order thereafter to facilitate the removal of such rods from the conveyor, the latter is usually associated with means for displacing or casting the finished rods laterally off the conveyor without manual intervention. Such means generally include a plurality of displacement elements or traverse members interspersed between the adjacent feed rolls and arranged to be raised and lowered relative to the conveyor rolls from an inactive position below the conveyor to an active position above the conveyor. When the traverse members are in their raised condition, their appropriately slanted upper surfaces define an inclined plane above the conveyor rolls so as to cause any rod engaged by the traverse members to be shifted off the conveyor to one side thereof or the other.

In a known arrangement of this type, the traverse members are vertically disposed metal plates, the upper edges of which are inclined to the horizontal. The metal plates are divided into two sets, with their upper edges being inclined in alternatingly opposite directions. Thus, when one set of these metal plates is raised, they define an inclined plane slanting to one side of the conveyor, while when the other set of metal plates is raised, they define an inclined plane slanting to the other side of the conveyor. Such an arrangement of metal plates is quite bulky and heavy, of course, and thus is not only expensive to produce, install and maintain but also mandates extra expenditures with respect to the size and strength of the piston and cylinder combinations and the associated fluid pressure systems which are required to raise and lower the individual plates.

SUMMARY OF THE INVENTION

It is an object of the present invention, therefore, to provide a novel and improved apparatus for displacing or casting profiled steel rods, such as concrete reinforcing rods, off a roll conveyor, which apparatus avoids the aforementioned drawbacks and disadvantages of the known apparatus of this class.

A more particular object of the present invention is the provision of such an apparatus which eliminates the need for two differently configured and arranged sets of displacement elements and nevertheless enables the rods to be displaced off the conveyor to either side thereof without any difficulty.

The objects of the present invention are attained by a construction of such an apparatus which has the following characteristics:

(a) The displacement elements or traverse members are elongated bars having opposite end regions extending beyond the ends of the conveyor rolls at both sides of the conveyor, and at the undersides of the bars in the opposite end regions thereof are arranged respective bearing element means.

(b) Frame means define, outwardly of the opposite sides of the conveyor and at a level below the latter, respective horizontally aligned upwardly open socket means for releasably supporting the associated bearing element means for rocking movement about respective axes parallel to the length of the conveyor, the bars when in an inactive position and supported at both end regions by the socket means through the intermediary of the bearing element means having their upper surfaces horizontal and below the path of movement of the rods along the conveyor.

(c) Respective piston and cylinder means, each having a cylinder end and a piston rod end, are associated with the bars at the opposite end regions of the latter for effecting the up and down movements thereof, each piston and cylinder means being pivotally supported at one of its ends and having its other end pivotally connected with the associated bearing element means.

(d) Fluid pressure source means are provided for selectively either extending the piston and cylinder means at one side of the conveyor while retaining the piston and cylinder means at the other side of the conveyor unextended, or vice versa, thereby to raise only the corresponding bearing element means out of the associated socket means and to retain the other bearing element means seated in the respective socket means (e) By virtue of the foregoing characteristics of the apparatus, upon the raising of only the bearing element means at either side of the conveyor out of the associated socket means, the bars are angularly moved upwardly into their active position about the axis of the bearing element means at the other side of the conveyor so that the upper surfaces of the bars, which are then above the path of movement of the rods on the conveyor, define a correspondingly inclined plane for elevating any rod engaged by the bars off the conveyor rolls and for causing it to be correspondingly cast laterally off the conveyor.

It will be understood that, within the context of the present invention, the piston and cylinder means can be connected directly or indirectly to the bearing element means. Furthermore, the traverse member or bars may be individual elements each associated with its own two piston and cylinder combinations, one adjacent each end, so that the bars can be tilted individually in one direction or the other as desired. It is further contemplated by the present invention, however, that the bearing element means at each side of the conveyor can be in the form of a single elongated bearing bolt and that a plurality of the traverse members or bars would all be supported at each end by a common elongated bearing bolt, so that such bars and their elongated bearing bolts would be assembled in a somewhat ladder-like configuration. In such an arrangement, with the piston and cylinder means being connected to the elongated bearing bolts, it would be possible to utilize only two piston and cylinder combinations, one for each side of the conveyor, in which case the respective piston and cylinder combinations would be connected to their associated bearing bolts in the mid-region of the ladder-like configuration. More commonly, and certainly more preferably from the standpoint of stability, there would be provided two pairs of piston and cylinder combinations, one pair for each side of the ladder-like configuration, and the piston and cylinder combinations of each pair would be connected to the associated elongated bearing bolts adjacent the opposite ends of the ladder-like configuration.

It will be apparent, therefore, that an arrangement according to the present invention is characterized by a number of advantages. Thus, the bars serving as the traverse members are considerably lighter in weight than would be the heretofore used metal plates, and all bars are identical both in form and in position within the apparatus, avoiding the need for two sets of differently shaped and positioned traverse members such as is required in the case of steel plates. Moreover, since the bars are supported by the bearing sockets, the need for special guide structures such as are required for the heavy steel plates is also eliminated, and at the same time the piston and cylinder combinations can be made lighter and less expensive and can operate at lower fluid pressures.

BRIEF DESCRIPTION OF THE DRAWING

The foregoing and other objects, characteristics and advantages of the present invention will be more clearly understood from the following detailed description thereof when read in conjunction with the accompanying drawing, in which:

FIG. 3 is a view similar to FIG. 2 but on a considerably enlarged scale, with some of the structural features being shown in section and in greater detail.

SPECIFIC DESCRIPTION

Figure 1:
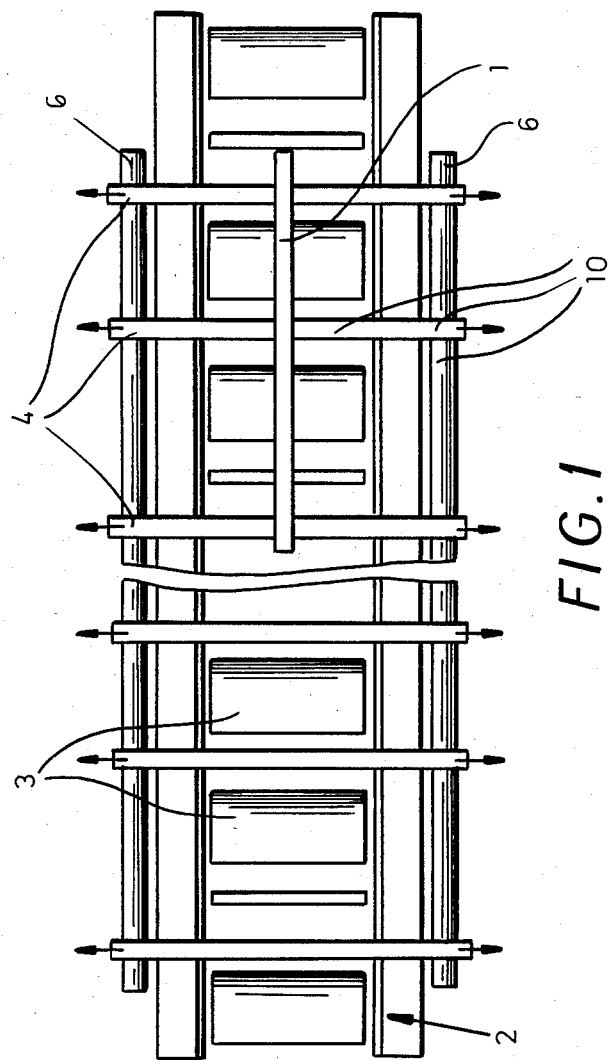
FIG. 1 is a fragmentary, schematic plan view of an apparatus for displacing or casting profiled steel rods off a roll conveyor in accordance with the present invention.

Referring now to the drawing in greater detail, the apparatus according to the present invention is designed for use in displacing or casting profiled steel rods 1, such as concrete reinforcing rods, off a conveyor 2, in particular a multi-roll conveyor mounted on a frame 2a and provided with a plurality of driven and/or idle feed rolls 3. To this end, the apparatus includes a plurality of displacement elements or traverse members 4 in the form of elongated bars which are interspersed with the conveyor rolls 3 and extend beyond the opposite ends of the latter and are adapted to be raised and lowered at their opposite end regions by means of associated piston and cylinder combinations 5. As can be best seen from FIGS. 2 and 3, when the bars 4 are raised at one end but not the other, they define a correspondingly inclined plane along which a rod 1 engaged by the bars can be elevated from the conveyor rolls 3 and cast off the conveyor to one side thereof or the other.

Figure 2:
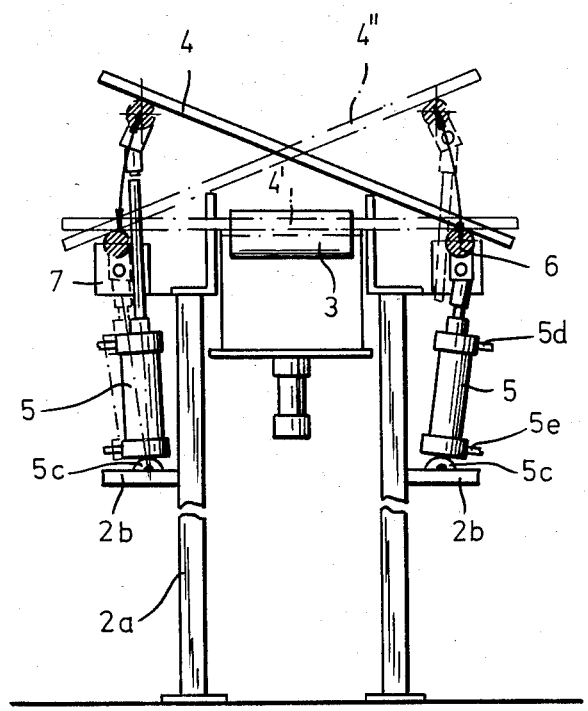
FIG. 2 is a schematic end elevational view of the apparatus shown in FIG. 1.

As further shown in FIGS. 2 and 3, in their opposite end regions the traverse members or bars 4 are associated with respective bearing elements 6 each of which is provided with a downwardly depending bracket or lug 6a. Each such lug or bracket is pivotally connected at 9 to a clevis or like element 5a which in turn is fixedly connected to the free end of the piston rod 5b of the associated piston and cylinder combination 5. At its other end, each of the piston and cylinder combinations 5 is pivotally supported at 5c on a bracket or like adjunct 2b of the frame of the conveyor. Each cylinder has ducts 5d and 5e communicating with its interior at its opposite ends, respectively, for connecting the cylinder to a suitable source of fluid pressure and to enable fluid pressure to be admitted into and exhausted from the cylinder at the opposite faces of the piston therein. Appropriate control means (not shown but generally conventional and within the knowledge of a person skilled in the art) are further provided to enable the piston and cylinder combinations 5 to be selectively extended and contracted. For reasons to be more fully explained presently, the control means is so arranged that when one of the piston and cylinder combinations is extended, the other one remains unextended, and vice versa.

In the preferred embodiment of the present invention, as illustrated in FIG. 1, the bearing elements 6 are in the form of a pair of elongated bearing bolts having generally cylindrical outer surfaces. The bearing bolts 6 are releasably supported by a pair of frame adjuncts 7 defining in their upper end regions respective semicylindrical, upwardly open sockets 7a, the sockets being horizontally aligned with each other and disposed below the locus of the uppermost surface portions of the conveyor rolls 3 (see FIG. 3). The traverse members or bars 4 (or at least a plurality of them) are supported at their opposite end regions by the bearing bolts 6. The bars and bearing bolts thus are essentially assembled in a ladder-like configuration 10 (the bearing bolts 6 in effect constituting the "stringers" and the bars 4 the "rungs" of the ladder-like configuration). By virtue of their cylindrical outer surfaces, furthermore, the bearing bolts 6 are rockably received in the sockets 7a.

In operation, initially the two piston and cylinder combinations 5 are both contracted or unextended, as a result of which the bearing bolts 6 are both received in the respective sockets 7a and the traverse members or bars 4 are in their inactive position with their upper surfaces disposed horizontally and below the path of movement of the rods 1 defined by the tops of the conveyor rolls, as shown in phantom outline at 4' in FIGS. 2 and 3. When one or more profiled steel rods 1 reaches the section of the conveyor 2 where the cast-off apparatus is located, then if the rods are to be displaced off to the right side of the conveyor as seen in FIGS. 2 and 3, the left-hand piston and cylinder combination 5 is extended while the right-hand piston and cylinder combination remains unextended. Thus, the left-hand bearing bolt 6 is raised out of its socket 7a and the traverse members 4 supported thereby are elevated into their active position, shown in solid lines in FIGS. 2 and 3, in which their upper surfaces are above the path of movement of the rods 1 along the conveyor, but the upper surfaces of the traverse members define an inclined plane slanting downwardly to the right by virtue of the fact that concomitantly with the raising of the left-hand bearing bolt 6 the right-hand bearing bolt 6 remained seated in its socket and was rocked about its longitudinal axis. Any of the rods 1 intercepted by the rising traverse members 4 will, of course, be displaced thereby and cast off the conveyor to the right side thereof. Quite obviously, if the rods 1 are to be cast off to the left side of the conveyor, the right-hand piston and cylinder combination 5 is extended while the left-hand piston and cylinder combination remains unextended, so that the traverse members ultimately reach their active position shown in phantom outline at 4" in FIGS. 2 and 3.

It will further be understood from the foregoing that the aforesaid movements of the traverse members or bars 4 can be effected by providing a single piston and cylinder combination 5 on each side of the conveyor, with each piston and cylinder combination at one end thereof being pivotally connected to the associated bearing bolt 6 in the mid-region of the ladder-like configuration 10. In order to secure a greater degree of stability for the apparatus, however, it is preferred to provide two pairs of piston and cylinder combinations, one pair at each side of the conveyor, with the two piston and cylinder combinations of each pair being connected to their respective bearing bolt at the opposite end regions of the ladder-like configuration.

In the former case, of course, each of the frame adjuncts 7 would be divided into two socket-defining sections, with the respective piston and cylinder combination being located and movable intermediate those sections. In the case of the paired piston and cylinder combinations, on the other hand, the socket-forming adjuncts 7 could be constructed as single units, with the two piston and cylinder combinations being located and movable at the forward and rearward ends of the socket structure.

In the preferred embodiment of the present invention, furthermore, the traverse members or bars 4 are fixedly connected, as by welding, to the upper sides of the bearing bolts 6. It will be apparent, however, that as an alternative the traverse members can be removably seated on the bearing bolts with the aid of suitable socket-like adjuncts affixed to the undersides of the traverse members.

It will be understood that the foregoing description of various embodiments of the present invention is for purposes of illustration only, and that the structural features of the apparatus disclosed herein are susceptible to a number of changes and modifications, none of which entails a departure from the spirit and scope of the present invention as defined by the hereto appended claim.

I claim:

1. A roller conveyor for rod and bar stock which comprises:
    an elongated frame structure having a pair of horizontally spaced members;
    a multiplicity of rollers disposed between said members and journaled thereon to form a conveyor track along which said stock can be displaced;
    a plurality of cross pieces each disposed between two such rollers and having ends lying laterally outwardly of said track and having an inoperative position wherein said cross pieces are disposed below the surface of a plane tangent to said rollers;
    a respective longitudinal beam disposed on each side of said track and rigidly connected to undersides of all of the ends of the plurality of cross pieces projecting at the respective side of said track, said beams extending parallel to said members;
    respective supports on each side of said frame structure for receiving from above the respective beam in said inoperative position of said cross pieces and shaped to permit rotation of the respective beam relative to the respective support upon elevation of the beam on the opposite side of said frame structure; and
    at least one fluid-operated cylinder pivotally connected to said structure on each of said opposite sides thereon and having a piston rod pivotally connected to the respective beam, the cylinder being selectively operable on opposite sides of said track for selectively raising one of said beams from a position in which it is held and from the respective support so as to pivot the beams and the cross pieces connected thereto about an axis defined by the beam on the opposite side of said structure and its said support.

* * * * *